United States Patent
Ninomiya

(10) Patent No.: US 7,539,099 B2
(45) Date of Patent: May 26, 2009

(54) INFORMATION RECORDING APPARATUS AND AN INFORMATION RECORDING SYSTEM

(75) Inventor: Masaki Ninomiya, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 333 days.

(21) Appl. No.: 10/927,411

(22) Filed: Aug. 27, 2004

(65) Prior Publication Data
US 2005/0063268 A1 Mar. 24, 2005

Related U.S. Application Data

(63) Continuation of application No. PCT/JP2004/002292, filed on Feb. 26, 2004.

(30) Foreign Application Priority Data
Sep. 19, 2003 (JP) ............................. 2003-327897

(51) Int. Cl.
G11B 7/125 (2006.01)
(52) U.S. Cl. ................... 369/47.53; 369/53.31
(58) Field of Classification Search .................. None
See application file for complete search history.

(56) References Cited

U.S. PATENT DOCUMENTS

| | | | |
|---|---|---|---|
| 5,072,435 A | 12/1991 | Bakx | |
| 5,471,457 A | 11/1995 | Bakx et al. | |
| 5,898,655 A | 4/1999 | Takahashi | |
| 6,157,609 A * | 12/2000 | Shoji et al. | 369/275.3 |
| 6,339,578 B1 * | 1/2002 | Sasaki et al. | 369/116 |
| 6,404,707 B1 * | 6/2002 | Kaneda et al. | 369/30.06 |
| 6,556,524 B1 | 4/2003 | Takeshita | |
| 6,577,570 B2 * | 6/2003 | Lee et al. | 369/47.53 |
| 6,643,233 B1 * | 11/2003 | Yen et al. | 369/47.15 |
| 6,876,611 B1 * | 4/2005 | Adachi | 369/47.53 |
| 6,912,188 B2 * | 6/2005 | Morishima | 369/47.53 |
| 6,975,571 B1 * | 12/2005 | Narumi et al. | 369/47.53 |
| 6,982,111 B2 * | 1/2006 | Mizushima et al. | 428/64.1 |
| 2001/0007546 A1 | 7/2001 | Lee et al. | |
| 2002/0044507 A1 * | 4/2002 | Hagiwara et al. | 369/47.4 |
| 2003/0035355 A1 | 2/2003 | Morishima | |
| 2003/0086345 A1 * | 5/2003 | Ueki | 369/47.51 |
| 2003/0133376 A1 * | 7/2003 | Matsumoto | 369/47.12 |
| 2004/0160873 A1 * | 8/2004 | Pereira | 369/47.53 |
| 2005/0030860 A1 * | 2/2005 | Gage et al. | 369/47.53 |

FOREIGN PATENT DOCUMENTS

EP 0 984 441 A1 3/2000

(Continued)

Primary Examiner—Michael V Battaglia
(74) Attorney, Agent, or Firm—Dickstein Shapiro LLP

(57) ABSTRACT

An information recording apparatus for recording information on an information recording medium that is recordable is disclosed. The information recording apparatus includes determining means for determining whether specific recording conditions for the information recording medium are recorded at a predetermined area of the information recording apparatus, or externally thereof; recording condition reading means for reading the specific recording conditions when such recording conditions are recorded; first recording means for recording the information based on the specific recording conditions; and evaluating means for performing trial writing test data on a trial writing area of the information recording medium based on predetermined default recording conditions when specific recording conditions are not recorded, and for evaluating a signal obtained by reproducing the test data.

6 Claims, 9 Drawing Sheets

FOREIGN PATENT DOCUMENTS

| | | |
|---|---|---|
| JP | 4-214208 | 8/1992 |
| JP | 7-73469 | 3/1995 |
| JP | 9-16964 | 1/1997 |
| JP | 9-167347 | 6/1997 |
| JP | 2001-67672 | 3/2001 |
| JP | 2001-283443 | 10/2001 |
| JP | 2002-334433 | 11/2002 |

* cited by examiner

FIG.3

STRATEGY TABLE 301

| MANUFACTURE ID 302 | MEDIA TYPE ID 303 | Ttop 304 | Tmp 305 |
|---|---|---|---|
| A | 01 | 2.0T | 0.87T |
| A | 02 | 2.1T | 0.74T |
| B | 01 | 1.9T | 0.80T |
| C | 01 | 2.0T | 0.80T |
| DEFAULT | | 1.8T | 0.70T |
| | | | |
| | | | |

//<br>

INFORMATION RECORDING APPARATUS AND AN INFORMATION RECORDING SYSTEM

CROSS-REFERENCE TO RELATED APPLICATION

This application is a U.S. continuation application filed under 35 USC 111(a) claiming benefit under 35 USC 120 and 365(c) of PCT application JP2004/002292, filed Feb. 26, 2004, which claims priority to Application Ser. No. 2003-327897, filed in Japan on Sep. 19, 2003. The foregoing applications are hereby incorporated herein by reference.

TECHNICAL FIELD

The present invention relates to an information recording apparatus for recording information on an information recording medium that is recordable, and an information recording system equipped with the information recording apparatus.

BACKGROUND TECHNOLOGY

For recording increased volume of information in recent years and continuing, mass information recording media, such as CD-ROM (Compact Disk Read Only Memory) and CD-R (Compact Disk Recordable) are widely used. Further, phase-change type optical recording media, such as CD-RW (Compact Disk Rewritable) having affinity to the CD-ROM and CD-R, have been developed and popularly used. The Orange Book part III (ver 1.0) published in October, 1996 standardizes twice linear speed recording (24 to 28 m/s) with such phase-change type optical recording media.

Optical disk apparatuses that are capable of information recording, reproduction, and rewriting at high density are also available for the phase-change type optical recording media.

For example, the JPA 2001-283443 discloses required recording conditions such as a power level and a pulse width of recording pulses of a laser light when a user records information on the optical disks such as CD-R/RW, DVD−R/RW, and DVD+R/RW.

Further, the JPA 2002-334433 discloses technology for an optical disk apparatus to determine recording strategy with reference to recording strategy information beforehand stored in an optical disk.

Generally, when a user records data on a recordable optical disk such as CD-R/RW, DVD−R/RW, and DVD+R/RW, recording conditions such as power levels and pulse widths of recording pulses (for example, parameters as indicated by the JPA, 2001-283443) of the laser light source for recording have to be determined. The recording conditions are called the recording strategy. Since the optimal recording strategy varies with properties of the recording material and the substrate of an optical disk, kind of the disk, and disk maker, the optimal parameters have to be determined for every optical disk.

According to the technology disclosed by the JPA, 2002-334433, an optical disk apparatus determines the optimal recording strategy with reference to the optimal recording strategy information that is beforehand recorded on the optical disk. However, the recording conditions written on the optical disk may not be applicable to all makers' optical disk apparatuses. This is because system parameters, such as laser wavelength, numerical aperture (NA) of an objective lens, rising time of a recording pulse, and the like differ from maker to maker of the optical disk apparatuses. Therefore, even if the technology of the JPA, 2002-334433 is used, and the optimal recording strategy information stored in the optical disk is used, optimal information recording may not be obtained.

Further, the optical disk apparatus may be capable of reading information, such as an identification of the maker and a version/model identifier of the optical disk from the loaded optical disk, and searching for recording strategy information possibly stored in the optical disk apparatus.

However, if the optical disk is an unknown optical disk, the strategy information of which is not registered by the optical disk apparatus, the optimal recording strategy cannot be set up. In this case, recording usually has to be carried out with a predetermined default recording strategy.

When recording information on optical disks, such as CD-R/RW, DVD−R/RW, and DVD+R/RW, it is necessary that recording be carried out at a laser power level (recording power level) that provides the optimal recording quality. For this purpose, a trial writing area, called PCA (Power Calibration Area), is usually prepared in optical disks, such as CD-R/RW, DVD−R/RW, and DVD+R/RW, and an optical disk apparatus adjusts the recording power through an OPC (Optimum Power Control) process, wherein trial writing is performed on the trial writing area, and the optimal recording power is determined from results obtained.

Thus, when information recording is carried out on an unknown optical disk without the optimal strategy information, the optical disk apparatus records at one of a predetermined basic strategy and a recording power level determined through the OPC process. Under this situation, there are cases where neither the predetermined basic strategy nor the recording power level determined through the OPC process is appropriate.

DISCLOSURE OF THE PRESENT INVENTION

The present invention aims at offering an information recording apparatus and an information recording system that can perform satisfactory information recording on any recording medium, whether or not optimal strategy information is beforehand available.

In order to attain the above-mentioned object, an aspect of the present invention provides an information recording apparatus for recording information on an information recording medium, the information recording apparatus including:

determining means for determining whether recording conditions specific to the information recording medium (specific recording conditions) are available at one of predetermined areas of the information recording apparatus and externally thereof, recording condition reading means for reading the specific recording conditions if the determining means determines that the specific recording conditions are available, first recording means for recording information based on the specific recording conditions, and evaluating means for performing trial writing of test data on a predetermined area of the information recording medium under predetermined default recording conditions, for reproducing the test data, and for evaluating the quality of a signal obtained when the test data are reproduced, in the case that the specific recording conditions are not available.

The evaluating means can carry out evaluation by reproducing the test data that are recorded as above, and by evaluating an amount of jitter of the reproduced signal. Further, the evaluating means can carry out the evaluation by evaluating the magnitude of an error rate of the reproduced signal.

Further, the information recording apparatus may be equipped with informing means for reporting a result of the evaluation to a user.

The information recording apparatus may be further equipped with selection receiving means for receiving a user selection as to whether information recording should be carried out when the informing means reports that there is no or low possibility of proper reproduction, second recording means for recording information under the predetermined default recording conditions if the user selection received by the selection receiving means is affirmative, and suspending means for stopping information recording when the user selection is negative.

Another aspect of the present invention provides an information recording system that includes the above-mentioned information recording apparatus, and a host computer connected to the information recording apparatus through a predetermined interface.

According to the present invention, when recording is to be carried out on an information recording medium, the recording conditions of which are not stored in a predetermined area, evaluations are carried out as to whether information can be satisfactorily recorded, and whether recording quality can be maintained at a reproducible grade. In this manner, poor quality recording can be avoided.

BRIEF EXPLANATION OF THE DRAWINGS

FIG. 3 is a strategy table of the information recording apparatus according to the embodiment.

EMBODIMENTS

Embodiments of the present invention are explained with reference to attached drawings.

Figure 1:
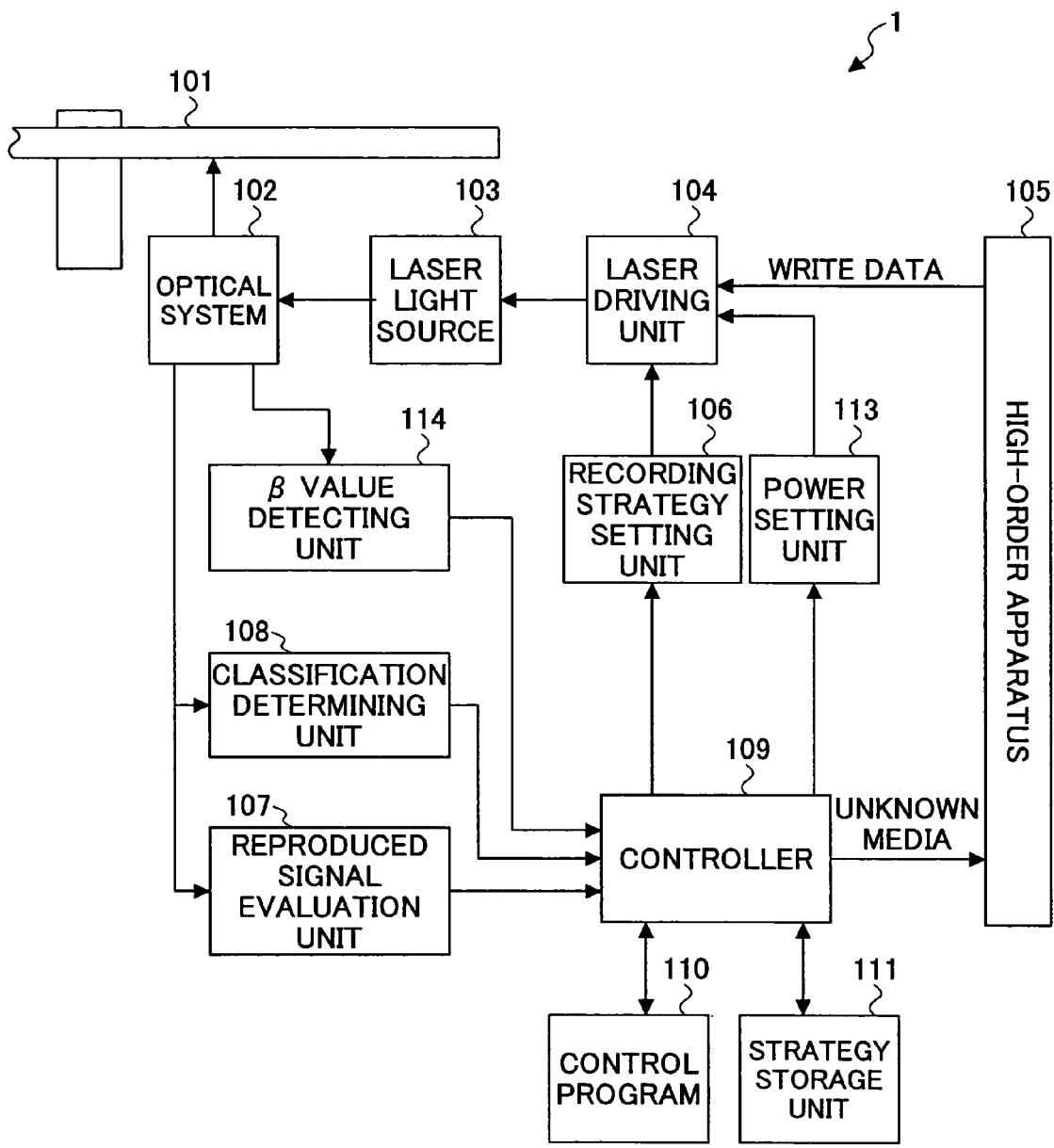
FIG. 1 is a block diagram of an information recording apparatus according to an embodiment of the present invention.

FIG. 1 is a block diagram showing electric connections of an information recording apparatus 1 according to the embodiment of the present invention. The information recording apparatus 1 is capable of recording and reproducing information on/from a medium 101 that is an information recordable medium, such as CD-R/RW, DVD-R/RW, and DVD+R/RW.

With reference to FIG. 1, a spindle motor (not illustrated) serving as a driving source rotates the medium 101. An optical system 102 includes certain optical units, and condenses an optical beam from a laser light source 103 to the recording surface of the medium 101. The optical system 102 and the laser light source 103 are arranged on an optical head (not shown), also called an optical pickup, and are driven by a driving motor (not shown) such that an optical spot of the laser light from the optical system 102 is irradiated to a desired position of the medium 101. Generally, a semiconductor laser is used as the laser light source 103, which is driven by a laser drive circuit 104 for emitting the light.

Figure 2:
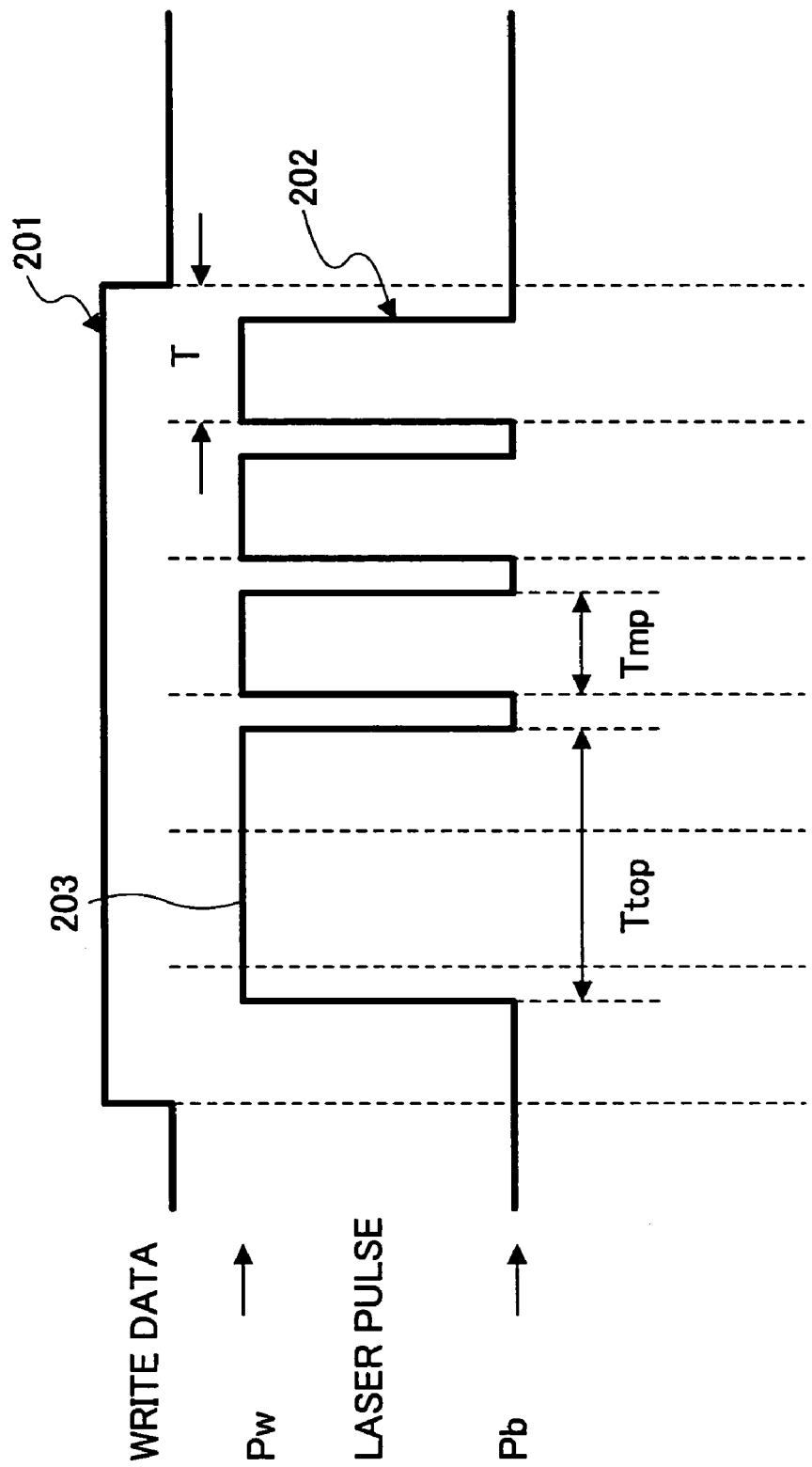
FIG. 2 is a waveform chart explaining relations between recording data and recording pulses of the information recording apparatus of according to the embodiment.

The power provided to the laser light source 103 for luminance is at a fixed power level when reading information recorded on the medium 101, and is pulse-modulated when recording data. The pulse modulation comes to be as shown in FIG. 2. That is, when recording to CD or DVD, recording data (information/data to be written) are provided by a high-order apparatus 105, such as a host computer, and are expressed by recording pulses, the pulse length of which ranges from 3T to 11T, where T represents a predetermined channel bit length. The recording pulses (laser pulses) of the laser constitute a bit "1" of the record data, e.g., a record mark section 201, representing a bit "1", is constituted by four recording pulses 202. In other words, the bit "1" is recorded by recording pulses that are finer (shorter in duration) than the bit "1".

The recording pulses 202 constituting the record mark 201 are called multi-pulses. The first of the multi-pulses, called a head pulse 203, is made a little longer than the following pulses in many cases, in order to quickly raise the temperature of the medium 101 such that a phase change is promoted. Ttop represents the pulse width of the head pulse 203. Tmp represents the pulse width of the pulses that follow the head pulse 203. Setting a pulse strategy, or a recording strategy, is setting values of Ttop, Tmp, and the like.

With reference to FIG. 1, the information recording apparatus 1 is further explained. A recording strategy setting unit 106 sets up the recording strategy of the laser drive circuit 104 by directions from a controller 109, which includes a microcomputer, the controller centrally controlling the entirety of the information recording apparatus 1 based on a control program 110 that is stored in a ROM, and the like. The recording strategy is beforehand defined for the kind of the medium 101, is stored in a strategy storage unit 111, and is registered as table data as shown in a strategy table 301 of FIG. 3, for example.

The strategy table 301 includes classification information beforehand recorded on the medium 101 (namely, Manufacturer ID 302 for identifying manufacturers of the medium 101, and Media Type ID 303 for identifying kinds of the medium 101), to which classification information, recording conditions such as pulse width Ttop 304, and pulse width Tmp 305 are associated. The strategy storage unit 111 is constituted by a non-volatile memory, such as a flash ROM. The strategy table 301 shown by FIG. 3 is an example. That is, the strategy table 301 may contain information about more pulse parameters, information about recording power, and information of a greater number of the media 101. Based on the classification information, the controller 109 determines the recording strategy of the medium 101, and sets the recording strategy to the strategy setting unit 106.

With reference to FIG. 3, a medium 101 model—named 01 manufactured by a maker A is characterized by "Ttop and Tmp=2.0T and 0.87T, respectively", another medium of the same manufacturer model—named 02 is characterized by "Ttop and Tmp=2.1T and 0.74T, respectively", and so on. These optimal parameters are stored.

There is "Default" entered in the Manufacturer ID column, parameters associated with which are used when one or both of Manufacturer ID and Media Type ID of a medium do not match.

When a medium 101 is loaded onto the information recording apparatus 1, a classification determining unit 108 reads the classification information (i.e., Manufacturer ID 302 and Media Type ID 303) beforehand stored in the medium 101 through the optical system 102, and provides the read classification information to the controller 109.

A reproduced signal evaluation unit 107 performs trial writing of test data on a trial writing area of the medium 101 (details below), reproduces and evaluates the recorded signal, and provides the evaluation result to the controller 109. Criterion for the evaluation of the reproduced signal is one of an jitter amount and an error rate of the RF signal that is obtained in a process of the reproduction.

The high-order apparatus 105 serves as a host computer to the information recording apparatus 1, and is connected to the information recording apparatus 1 through a predetermined interface. The information recording system 1 and the high-order apparatus 105 constitute an information recording system. The high-order apparatus 105 provides the recording information (information to be recorded) to the laser drive circuit 104 for recording on the medium 101.

The controller 109 searches for and sets up the strategy parameters corresponding to the medium 101 from the strategy table 301 before information recording starts. When the medium 101 is not registered in the strategy table 301, the controller provides information that the medium 101 is unknown to the high-order apparatus 105. Then, a message indicating that the medium 101 is unknown is displayed at a display area of the high-order apparatus 105.

Next, details of trial writing are described. A process of trial writing is also called OPC (Optimum Power Control), wherein predetermined test data are recorded on a predetermined trial writing area (provided at the inner periphery and the perimeter part) of the medium 101 with recording power levels being shifted at a given linear velocity, then the recorded test data are reproduced, an evaluation step is performed for determining the quality of the reproduced data, and a recording power level that provides the best quality is determined to be the optimal recording power level for the medium 101.

Recording power level shifting at the trial writing is carried out by a power setting unit 113 (refer to FIG. 1) controlling the laser drive circuit 104 according to directions from the controller 109. After the test data are recorded on the trial writing area, the optical system 102 of the optical pickup (not shown) reproduces the recorded data, and an RF signal is obtained. Then, the RF signal is evaluated using a predetermined criterion, i.e., the jitter amount or the error rate, such that the optimal recording condition is determined.

Figure 4A:
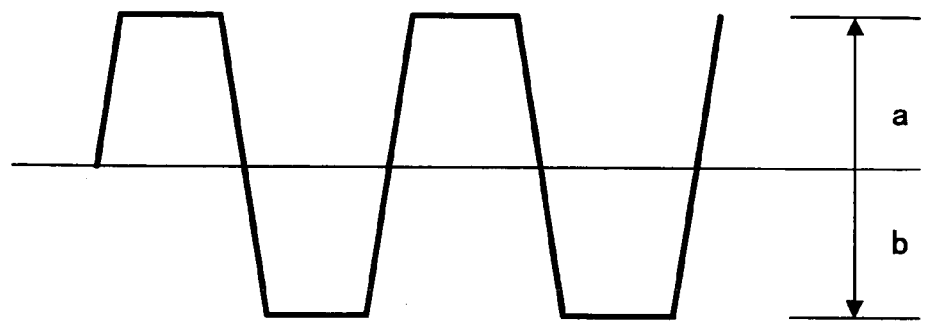
FIGS. 4A, 4B and 4C are graphs explaining the case where low frequency components of RF signal are removed by AC coupling, and an upper side envelope level and a lower side envelope level are detected.
Figure 4B:
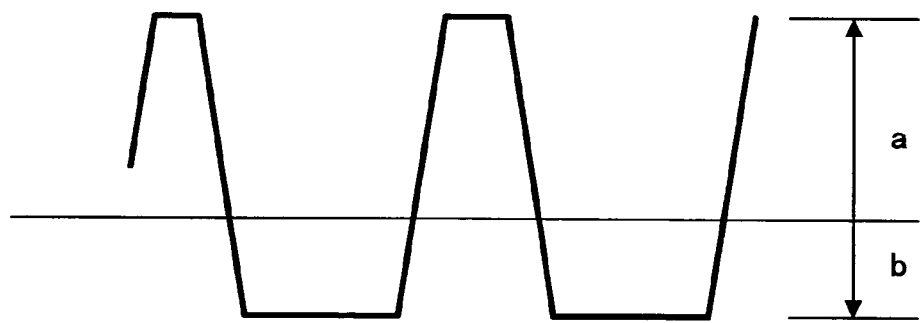
Figure 4C:
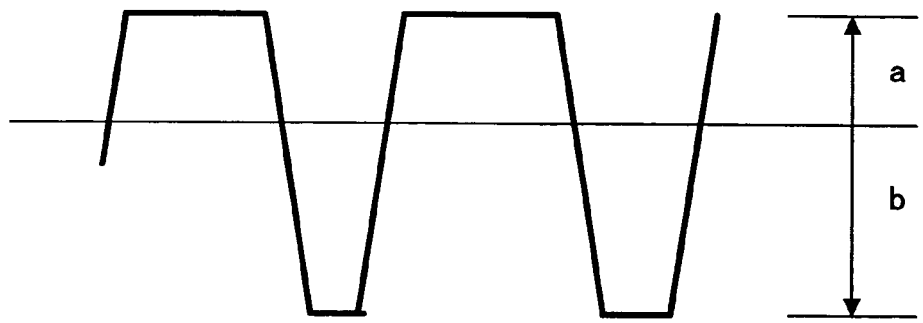

A β value detecting unit 114 evaluates a parameter β of the reproduced RF signal. The β value detecting unit 114 removes low-frequency components of the RF signal (AC coupling), and detects the upper side envelope level a, and the lower side envelope level b. Further explanations follow with reference to the attached drawings. Here, it is premised that the reflection factor falls at the record mark section 201 (ref. FIG. 2) as the property of the recording film of the medium 101, and that the intensity of the RF signal becomes low at the low reflective section, i.e., at the record mark section 201. In this case, the AC-coupled RF signal looks as shown by FIG. 4A if the recording state is proper, wherein the waveform is symmetrical with the upper side a and the lower side b being equal, i.e., "a=b". In the case that the recording power is excessive, the record mark section becomes long, and the waveform of the AC-coupled RF signal looks as shown by FIG. 4B, wherein the upper side a is greater than the lower side b, i.e., "a>b". Conversely, in the case that the recording power is too low, the record mark section becomes short, and the waveform of the AC-couple RF signal looks as shown by FIG. 4C, wherein the lower side b is greater than the upper side a, i.e., "a<b".

The parameter β is defined as being equal to the difference a−b normalized by the amplitude of the RF signal "a+b", that is, "$\beta=(a-b)/(a+b)$". Where the parameter β is great, it indicates that the power is in excess, and vice versa. The optimal power is when parameter β takes a certain value βtarget (for example, about 4%). OPC performs trial writing with the recording power levels changing, evaluates the β value, and obtains a recording power level that provides the βtarget.

Figures 5A, 5B:
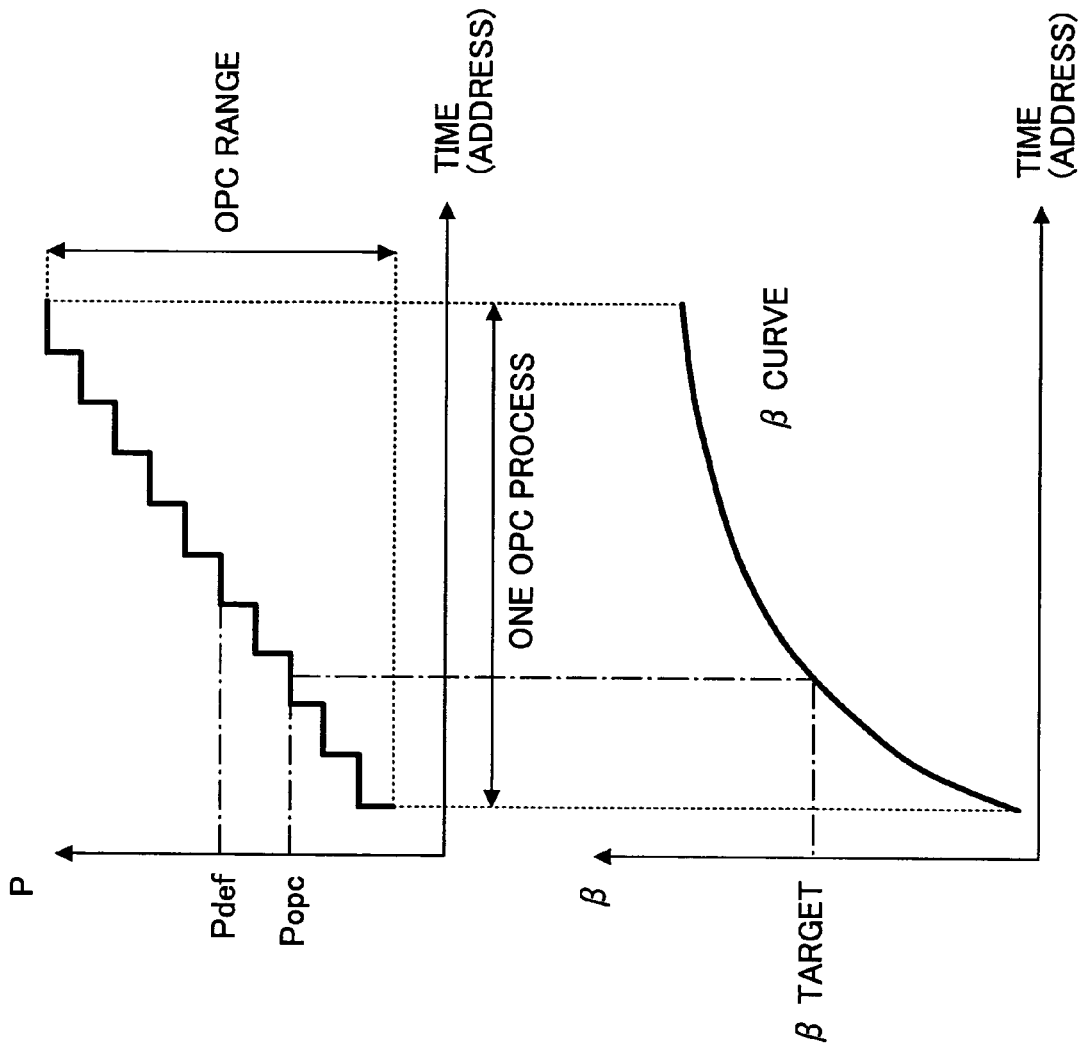
FIGS. 5A and 5B are graphs explaining relations between recording power P and a parameter β.

Relations between the recording power levels and the parameter β values are explained. FIG. 5A shows a graph how the recording power levels (P) change in time that is equivalent to an address change (Time (Address)), and ten recording power levels are provided as an example. A range wherein the recording power levels are changed is called an OPC range. The central power level is called Pdef. The OPC range may be defined by, for example, ten levels within a range from +40% to −30% in reference to the central power Pdef. According to another example of the definition, the OPC range is set between +5 mW and −4 mW in 1 mW steps with reference to the central power Pdef.

Then, ten β values are obtained, from which an approximated curve is obtained using the second order approximation as shown by FIG. 5B. Then, an optimal recording power level Popt that gives the βtarget is determined. When actually recording, Popt may slightly fluctuate due to temperature changes and the like. In order to minimize such fluctuation, it is desirable that the Popt be determined near the central power level Pdef if possible. Further, since the recording power Popt often differs medium to medium 101, it is desirably set up together with the writing strategy of the loaded medium 101.

In the following, embodiments of the trial writing process that the information recording apparatus 1 performs for trial writing, and starting information recording on the medium 101 are explained.

Figure 6:
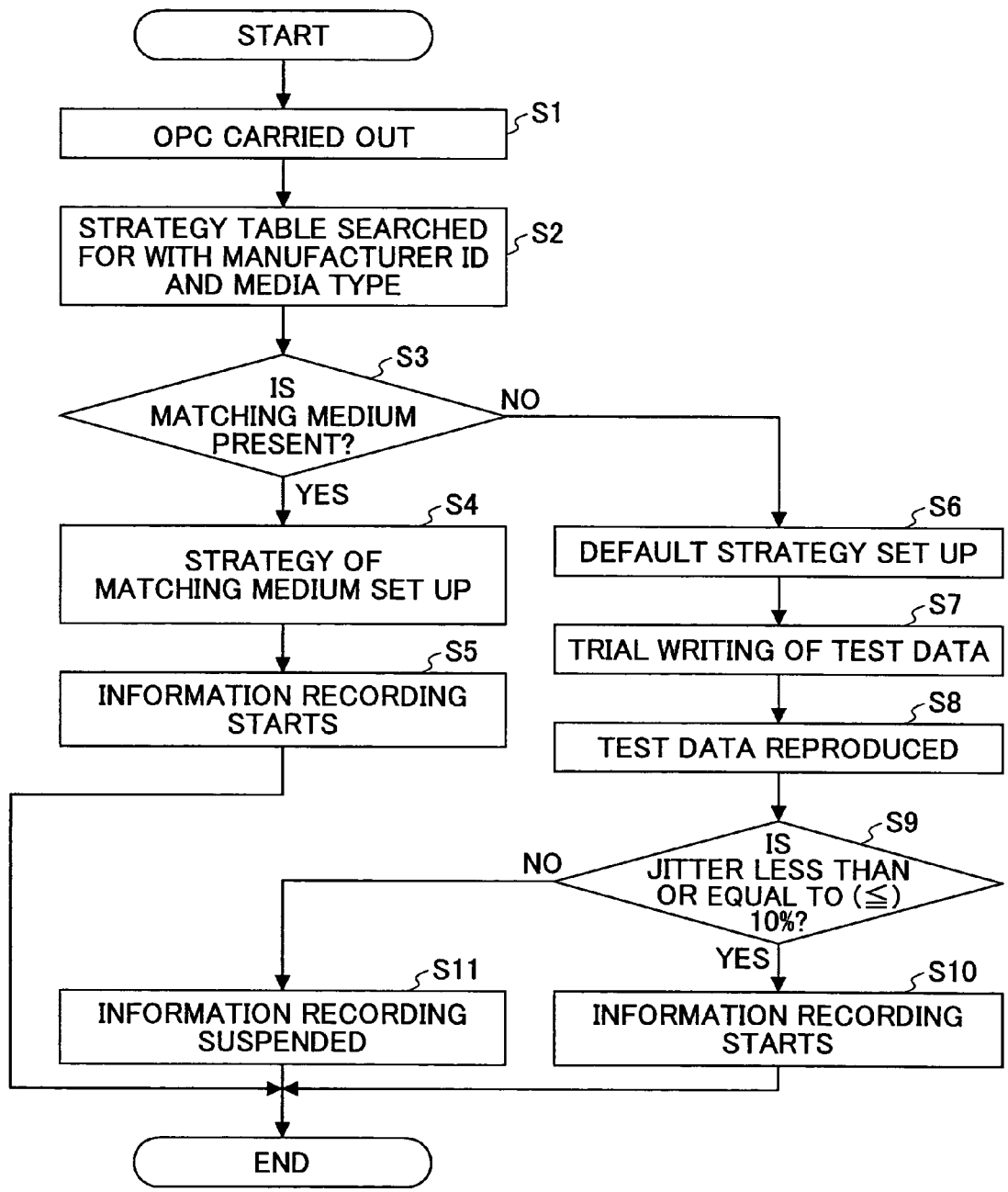
FIG. 6 is a flowchart of a process performed by the information recording apparatus according to the embodiment.

FIG. 6 is a flowchart according to one of the trial writing process embodiments. First, the controller 109 performs trial writing, as described above, on the medium 101 that is loaded onto the information recording apparatus 1, and obtains the optimal recording power level (Step S1). Then, the manufacturer ID 302 and the media type ID 303 of the medium 101 are read, and the strategy table 301 is searched with the manufacturer ID 302 and the media type ID 303 as the key (Step S2). Then, the determining means determines whether the manufacturer ID 302 and media type ID 303 of the medium 101 are registered in the strategy table 301. If the determination is affirmative, i.e., Y at Step S3, the recording condition reading means reads the optimal recording strategy (pulse width Ttop 304, and pulse width Tmp 305) corresponding to the medium 101 of the manufacturer ID 302 and media type ID 303, and the optimal recording strategy is set to the strategy setting unit 106 (Step S4). Then, the first recording means starts recording the information (actual data to be recorded) on the medium 101 (Step S5).

If the determination above is negative, i.e., N at Step S3, since no recording strategy is available, the medium 101 is considered to be an unknown medium, and a predetermined basic strategy is set up (Step S6). Trial writing is carried out with the predetermined basic strategy, i.e., OPC is carried out, and test data are recorded on the trial writing area (Step S7). The recorded test data are reproduced (Step S8). Then, a jitter evaluation is carried out on the reproduced signal in reference to a predetermined threshold amount of the jitter, which is set at 10% in this example (Step S9). The threshold amount of the jitter is usually set at the greatest allowable amount of jitter with which reproduction of the recorded test data is possible. These steps S6 through S9 realize the evaluating means.

If the jitter amount is determined to be 10% or less (Y of Step S9), since the recorded information is reproducible, information recording is started on the medium 101 (Step S10). To the contrary, if the jitter amount is determined to be greater than 10% (N of Step S9), since the recorded information will not be reproducible, the information recording on the medium 101 using the basic strategy is stopped (Step S11).

Figure 7:
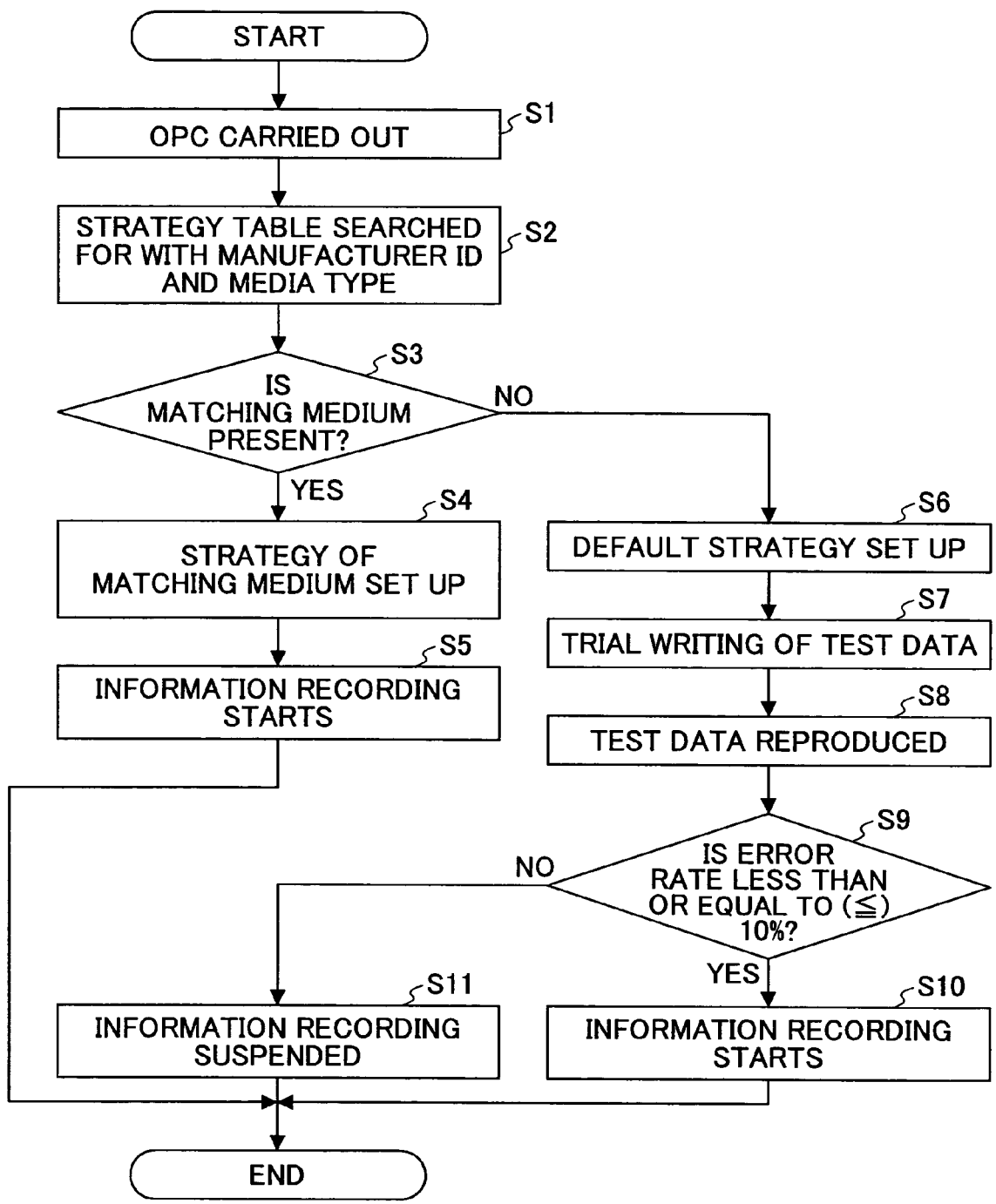
FIG. 7 is a flowchart of another process performed by the information recording apparatus according to the embodiment.

FIG. 7 is a flowchart according to the second of the trial writing process embodiments.

This process is different from the process shown by FIG. 6 in that an error rate of the reproduced signal is used as the criterion of the evaluation, not the jitter amount, at Step S9. A threshold error rate is set at 10% in this example; however, a greatest allowable error rate, at which information reproduction is possible, shall normally be used.

If the error rate is determined to be 10% or less (Y at Step S9), since the recorded information is reproducible in this example, information recording is started on the medium 101 (Step S10). To the contrary, if the error rate is greater than 10% (N at Step S9), since the recorded information cannot be reproduced, the information recording on the medium 101 using the basic strategy is stopped (Step S11). Other steps shown in FIG. 7 are the same as FIG. 6, and detailed explanation thereof is omitted.

Figure 8:
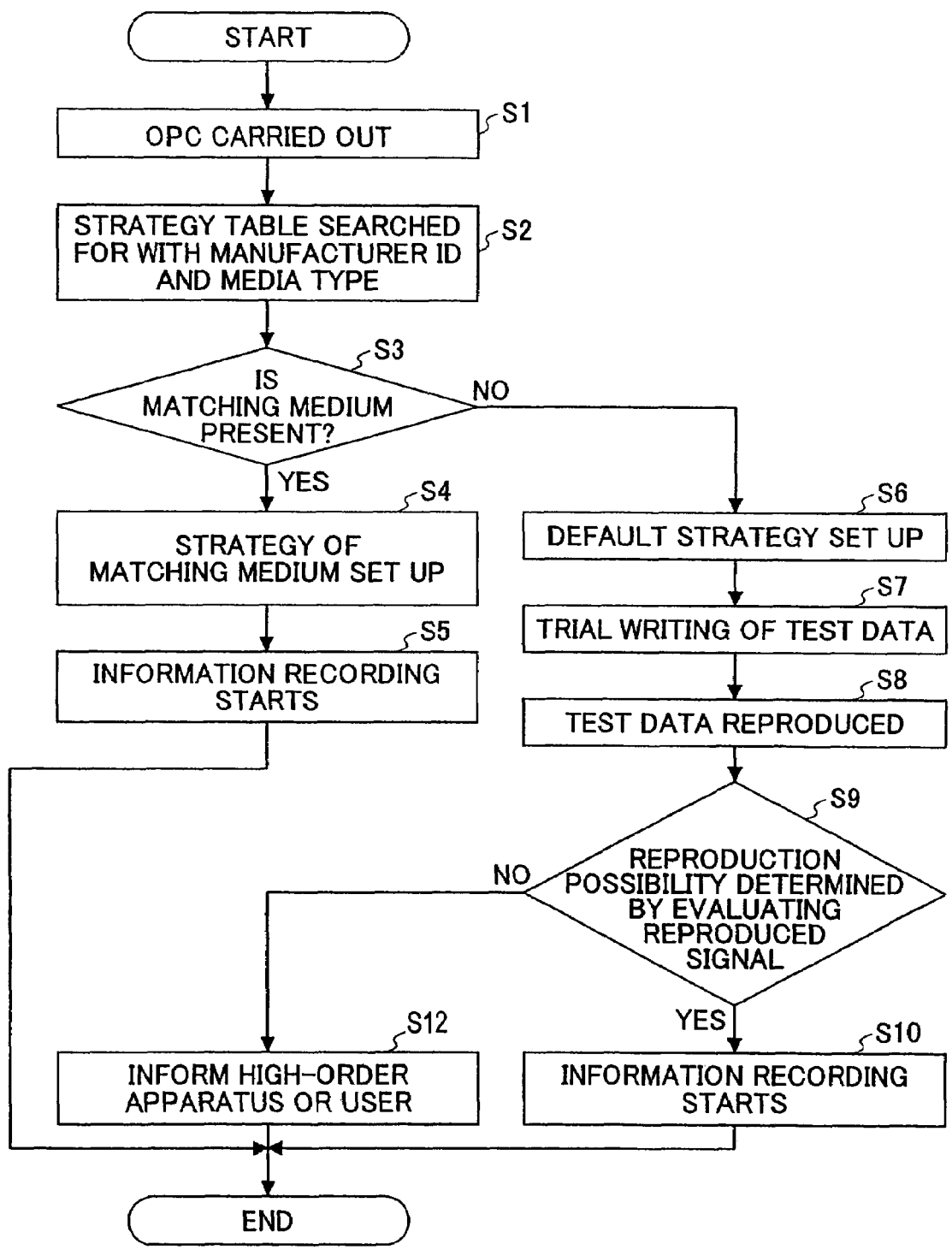
FIG. 8 is a flowchart of another process performed by the information recording apparatus according to the embodiment.

FIG. 8 is a flowchart according to the third of the trial writing process embodiments.

In FIG. 8, Steps S1 through S9 are the same as those of the process shown by FIG. 6 and FIG. 7, and detailed explanation thereof is omitted. At Step S9, evaluation of the reproduced signal may use either of the criteria described above, namely, the jitter amount and the error rate.

In the process, the signal reproduced at Step S8 is evaluated at Step S9. If it is determined that there is no possibility of information reproduction, or the possibility is low (N of Step S9), a message to this effect is provided to the high-order apparatus 105, and/or displayed on a display (not illustrated) of the information recording apparatus 1 (informing means) so that a user can select which action to take (Step S12).

Figure 9:
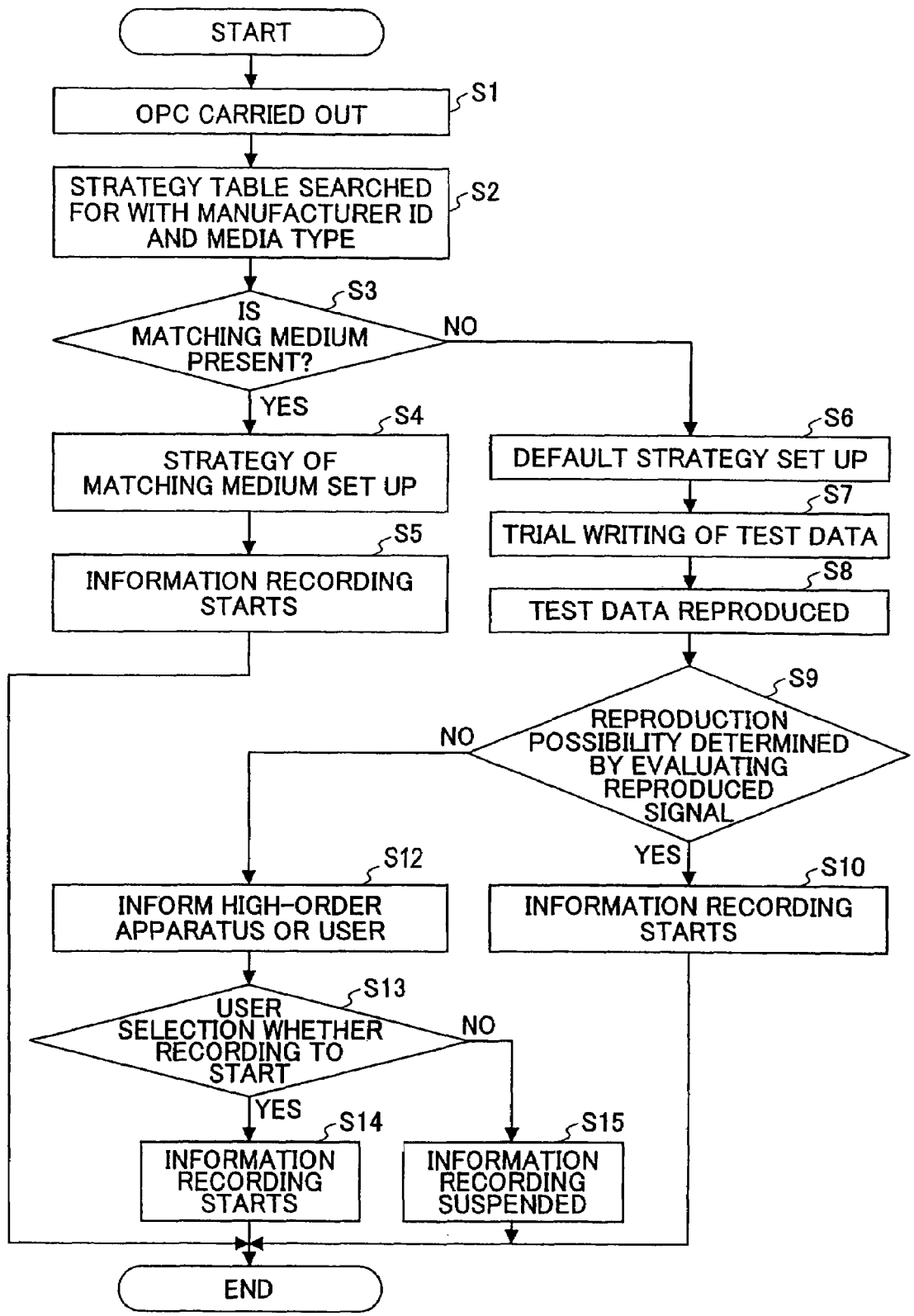
FIG. 9 is a flowchart of another process performed by the information recording apparatus according to the embodiment.

FIG. 9 is a flowchart according to the fourth of the trial writing process embodiments.

In FIG. 9, Steps S1 through S10 and S12 are the same as those of the process shown by FIG. 8, and detailed explanation thereof is omitted. This process is characterized by providing user selection receiving means. When the message to the effect that there is no or low possibility of reproducing is provided at Step S12 by the informing means, the user can decide whether information recording is to be carried out or suspended. User selection is performed at the high-order apparatus 105, or alternatively, by operating a predetermined operations button (not shown) provided to the information recording apparatus 1 (Step S13). If the user selection is affirmative, the process proceeds to Step S14 wherein second recording means performs information recording based on, e.g., recording strategy associated with "Default" of the strategy table 301. Otherwise, the process proceeds to Step S15 wherein suspending means suspends the information recording.

Although the embodiments are explained based on searching for the recording strategy of various media 101 stored in the strategy table 301 of the information recording apparatus 1 (Step S2), the present invention is not limited to this. That is, recording strategy of such various media 101 may be placed outside the information recording apparatus 1, which recording strategy is read. For example, the present invention can be implemented by using the recording strategy stored in the medium 101 where the recording strategy is available in the medium 101 (as disclosed by the JPA 2002-334433), and by carrying out Steps S6 through S10 and S12 through S15 where such strategy is not available in the medium 101.

The present invention is not be limited to the embodiments specifically described above, but various modifications and improvements are possible within the scope of the present invention.

What is claimed is:

1. An information recording apparatus for recording information on an information recording medium comprising a phase-change material that is recordable and rewritable, the recording apparatus comprising:

determining device for determining whether recording conditions specific to said information recording medium are recorded in one of a predetermined area inside of and a predetermined area outside of said apparatus, said specific recording conditions including a length of each of a plurality of multi-pulses;

recording condition reading device for reading said specific recording conditions if said specific recording conditions are recorded in said predetermined area inside of said apparatus;

recording device for recording said information in said phase-change material based on said specific recording conditions;

evaluating device for performing trial writing of test data on a trial writing area of said information recording medium based on predetermined default recording conditions when said specific recording conditions are not recorded, for reproducing said test data from said trial writing area, and for evaluating a signal obtained when reproducing said test data, said evaluating a signal comprising determining upper and lower limits of an RF signal; and evaluating result determining device for:
  evaluating whether or not the information can be actually recorded using said default recording conditions;
  evaluating whether or not recording can be performed in such a degree of recording quality that reproduction can be made therefrom; and
  if a determination is made that the degree of recording quality cannot be obtained, not recording, wherein criterion of said evaluating device evaluating said signal is a jitter amount of said signal, and wherein, when said jitter amount is less than or equal to 10%, recording of information is started; wherein the information recording apparatus further comprising: information device for providing a result of said evaluation of said signal obtained when reproducing said test data to a user; selection receiving device for receiving a user selection from said user as to whether information recording on said information recording medium is to be carried out when there is no possibility or low possibility that recorded information can be properly reproduced; and wherein said recording device is further configured to record said information based on said predetermined default recording conditions when said user selection is to carry out information recording; and stop information recording when said user selection is to stop information recording.

2. An information recording system, comprising:

said information recording apparatus as claimed in claim 1; and a host computer connected to said information recording apparatus through a predetermined interface.

3. The information recording apparatus as claimed in claim 1, wherein a first of said plurality of multi-pulses has a length longer then a length of subsequent multi-pulses.

4. An information recording apparatus for recording information on an information recording medium comprising a phase-change material that is recordable and rewritable, the recording apparatus comprising:

determining device for determining whether recording conditions specific to said information recording medium are recorded in one of a predetermined area inside of and a predetermined area outside of said apparatus, said specific recording conditions including a length of each of a plurality of multi-pulses;

recording condition reading device for reading said specific recording conditions if said specific recording conditions are recorded in said predetermined area inside of said apparatus;

recording device for recording said information in said phase-change material based on said specific recording conditions;

evaluating device for performing trial writing of test data on a trial writing area of said information recording medium based on predetermined default recording conditions when said specific recording conditions are not recorded, for reproducing said test data from said trial writing area, and for evaluating a signal obtained when reproducing said test data, said evaluating a signal comprising determining upper and lower limits of an RF signal; and evaluating result determining device for:

evaluating whether or not the information can be actually recorded using said default recording conditions;

evaluating whether or not recording can be performed in such a degree of recording quality that reproduction can be made therefrom; and if a determination is made that the degree of recording quality cannot be obtained, not recording, wherein criterion of said evaluating device evaluating said signal is an error rate of said signals, and wherein, when said error rate is less than or equal to 10% recording of information is started; wherein the information recording apparatus further comprising: information device for providing a result of said evaluation of said signal obtained when reproducing said test data to a user; selection receiving device for receiving a user selection from said user as to whether information recording on said information recording medium is to be carried out when there is no possibility or low possibility that recording information can be properly reproduced; and wherein said recording device is further configured to record said information based on said predetermined default recording conditions when said user selection is to carry out information recording; and stop information recording when said user selection is to stop information recording.

5. An information recording system, comprising:

said information recording apparatus as claimed in claim 4; and a host computer connected to said information recording apparatus through a predetermined interface.

6. The information recording apparatus as claimed in claim 4, wherein a first of said plurality of multi-pulses has a length longer then a length of subsequent multi-pulses.

* * * * *